United States Patent
Spenninger

(10) Patent No.: US 11,919,167 B2
(45) Date of Patent: Mar. 5, 2024

(54) SPECIFYING SAFE VELOCITIES FOR A ROBOT MANIPULATOR

(71) Applicant: Franka Emika GmbH, Munich (DE)

(72) Inventor: Andreas Spenninger, Karlsfeld (DE)

(73) Assignee: Franka Emika GmbH, Munich (DE)

(*) Notice: Subject to any disclaimer, the term of this patent is extended or adjusted under 35 U.S.C. 154(b) by 371 days.

(21) Appl. No.: 17/599,181

(22) PCT Filed: Mar. 19, 2020

(86) PCT No.: PCT/EP2020/057573
§ 371 (c)(1),
(2) Date: Sep. 28, 2021

(87) PCT Pub. No.: WO2020/200805
PCT Pub. Date: Oct. 8, 2020

(65) Prior Publication Data
US 2022/0184805 A1    Jun. 16, 2022

(30) Foreign Application Priority Data

Apr. 1, 2019    (DE) ............... 10 2019 108 390.7

(51) Int. Cl.
*B25J 9/16*    (2006.01)

(52) U.S. Cl.
CPC ........... *B25J 9/1651* (2013.01); *B25J 9/1638* (2013.01); *B25J 9/1641* (2013.01); *B25J 9/1653* (2013.01); *B25J 9/1666* (2013.01); *B25J 9/1676* (2013.01)

(58) Field of Classification Search
CPC ...... B25J 9/1638; B25J 9/1666; B25J 9/1653; B25J 9/1676; B25J 9/1641; B25J 9/1651
See application file for complete search history.

(56) References Cited

U.S. PATENT DOCUMENTS

2003/0233171 A1    12/2003   Heiligensetzer
2007/0120512 A1     5/2007   Albu-Schaffer et al.
(Continued)

FOREIGN PATENT DOCUMENTS

DE          10226853 B3     2/2004
DE       102005054575 B3    4/2007
(Continued)

OTHER PUBLICATIONS

Rich et al., Robot Programming and Artificial Intelligence, 1989, IEEE, p. 281-315 (Year: 1989).*

(Continued)

*Primary Examiner* — McDieunel Marc
(74) *Attorney, Agent, or Firm* — Hoffmann & Baron, LLP

(57) ABSTRACT

A method for specifying a velocity of a robot manipulator, including: providing a database that has a data record for each of selected surface points on the manipulator, wherein each data record indicates, for each of possible stiffnesses and/or masses of an object in an environment of the manipulator, a safe normal velocity of each surface point, wherein the normal velocity is a component of the velocity vector of each surface point perpendicular to a surface of each surface point, detecting an actual stiffness and/or an actual mass of the object in the environment, assigning the actual stiffness and/or the actual mass to a normal velocity of a given data record for each surface point, and specifying a velocity for each surface point on a current or planned path of the manipulator, such that the velocity at each surface point is less than or equal to an assigned normal velocity.

18 Claims, 1 Drawing Sheet

(56) References Cited

U.S. PATENT DOCUMENTS

| | | | |
|---|---|---|---|
| 2016/0026751 A1 | 1/2016 | Walther | |
| 2016/0144510 A1 | 5/2016 | Gulhar et al. | |
| 2018/0081340 A1 | 3/2018 | Haddadin et al. | |
| 2020/0238521 A1 | 7/2020 | Kogan | |
| 2023/0122689 A1* | 4/2023 | Tan | B61J 99/00 700/248 |
| 2023/0191635 A1* | 6/2023 | Vu | B25J 9/1676 700/259 |
| 2023/0202042 A1* | 6/2023 | Johnson | G06Q 50/28 700/248 |
| 2023/0286147 A1* | 9/2023 | Rabindran | B25J 9/1689 700/245 |
| 2023/0286160 A1* | 9/2023 | Yuelai | B25J 19/022 700/254 |
| 2023/0296640 A1* | 9/2023 | Guarracina | B25J 21/00 700/228 |

FOREIGN PATENT DOCUMENTS

| | | |
|---|---|---|
| DE | 102013019450 A1 | 5/2015 |
| DE | 102014011012 A1 | 1/2016 |
| DE | 102015106227 B3 | 5/2016 |
| DE | 102014224122 A1 | 6/2016 |
| DE | 102015011910 A1 | 3/2017 |
| EP | 2977149 A2 | 7/2015 |
| EP | 3563985 A1 | 11/2019 |
| JP | 2018-103343 A | 7/2018 |

OTHER PUBLICATIONS

Lozano-Perez, Robot programming, 1983, IEEE, p. 821-841 (Year: 1983).*

Lee et al., The direct teaching and playback method for robotic deburring system using the adaptiveforce-control, 2009, IEEE, p. 235-241 (Year: 2009).*

Navarro et al., In Pursuit of Safety: An Open-Source Library for Physical Human-Robot Interaction, 2018, IEEE, p. 39-50 (Year: 2018).*

"Mitsubishi Industrial Robot Series RH-3SDHR series Standard Specifications Manual", mitsubishielectric.com, Jan. 1, 2012, pp. 1-266, Retrieved from the Internet: https://za3a.mitsubishielectric.com/fa/en/mymitsubishi/download_manager?id=6347 [retrieved on Mar. 22, 2016].

English-language translation of International Preliminary Report on Patentability issued in International Application No. PCT/EP2020/057573 dated Oct. 14, 2021.

* cited by examiner

SPECIFYING SAFE VELOCITIES FOR A ROBOT MANIPULATOR

CROSS-REFERENCE TO RELATED APPLICATIONS

The present application is the U.S. National Phase of PCT/EP2020/057573, filed on 19 Mar. 2020, which claims priority to German Patent Application No. 10 2019 108 390.7, filed on 1 Apr. 2019, the entire contents of which are incorporated herein by reference.

FIELD

The invention relates to a method for specifying a safe velocity of a robot manipulator, as well as to a robot manipulator having a control unit which is designed, in particular, for specifying a safe velocity for the robot manipulator.

SUMMARY

The object of the invention is to operate a robot manipulator in such a way that it suffers only limited damage in the event of an unexpected collision with an object in the environment of the robot manipulator.

The invention is defined by the features of the independent claims. Advantageous developments and embodiments are the subject matter of the dependent claims.

A first aspect of the invention relates to a method for specifying a safe velocity of a robot manipulator, the method including:
  providing a database, wherein the database has a data record for each of a plurality of selected surface points on the robot manipulator, wherein the data records each specify a safe normal velocity of each of the surface points for each of a plurality of possible stiffnesses and/or masses of an object in the environment of the robot manipulator, wherein the normal velocity is the component of the velocity vector of each of the surface points which is perpendicular to the local surface of the robot manipulator at each of the surface points;
  detecting an actual stiffness and/or an actual mass of the object in the environment of the robot manipulator through prior knowledge or through sensory acquisition, or assuming infinity;
  assigning each detected actual stiffness and/or each actual mass to a safe normal velocity of the given data record for each of the surface points; and
  specifying a velocity for each of the surface points on a current or planned path of the robot manipulator, such that the normal velocity occurring at each surface point is less than or equal to the assigned safe normal velocity.

The robot manipulator is understood to mean, in particular, a manipulator consisting of a plurality of links connected to each other by joints. In particular, an end effector is also part of the robot manipulator. The links of the robot manipulator do not necessarily have to be arranged in a coherent kinematic chain. The method according to the invention can also be used in a two-arm system and in a humanoid robot system.

Each of the surface points of the robot manipulator is selected in advance in such a manner that the database size is not larger than necessary, but a sufficiently large number of surface points on the surface of the robot manipulator is taken into account for possible collisions of the robot manipulator with an object in the environment of the robot manipulator.

The component of the velocity vector that is perpendicular to the surface at each of the surface points is, in particular, perpendicular to the local surface of the structural component of the robot manipulator on which the given surface point is arranged. The locations of the surface points are preferably imagined on a surface of the robot manipulator, such that a tangential plane is clearly defined at the given location of each of the surface points relative to the robot manipulator.

A data record has a safe normal velocity assigned for each of a plurality of possible stiffnesses and/or masses. In particular, the large number of possible stiffnesses and/or masses is specified by an equidistant grid. As such, by detecting the actually present stiffness and/or the mass of the object in the environment, the data record can be used to compare the actually present stiffness and/or the actual mass of the object in the environment with the plurality of possible stiffnesses and/or masses of the given data record, to find the most suitable entry in order to arrive at a safe normal velocity as specified in the data record. Because a stiffness of the object is taken into account, if a collision occurs, the path which the robot manipulator can travel upon hitting the object, with the given resistance of the object, until its velocity has reached the lowest value, is taken into account. If the object is not a fixed object—which could be approximated as an infinite mass, such as a wall, a steel frame, a heavy vehicle, or other objects whose mass is significantly higher than the mass of the robot manipulator, or objects that are fixed to the environment of the robot manipulator, such as a support column that is firmly embedded in the floor—but rather a small moving object, then the result of the collision would be an elastic or plastic impact of two masses, of which the first mass is formed, in particular, by a reflected mass of the robot, and a second mass is formed by the object, wherein the reflected mass is the mass fraction of the robot manipulator which actually generates by its movement a momentum on the object upon collision with the object. Such an elastic or plastic impact will typically not bring the robot manipulator as a whole to a standstill, but, depending on whether the impact is more plastic or elastic, may possibly only lead to a slight velocity reduction of the robot manipulator—which greatly reduces the load on the links of the robot manipulator and on the joints of the robot manipulator, in particular, a gear on one of the joints. In the case of an elastic or plastic impact for which the mass of the object is taken into account, the mass of the object and the stiffness of the object must therefore be taken into account in order to accurately determine the effect of the collision.

The robot manipulator is preferably operated only at the safe normal velocity, or at a velocity below the given safe normal velocity at each of the surface points. The safe normal velocity in this case relates to a component of the current velocity vector of each of the surface points in three-dimensional space which is perpendicular to the surface on which the given surface point is located. The normal velocity is, in particular, also perpendicular to a tangential velocity of each of the surface points—which, however, is not considered here.

If an unexpected collision of the robot manipulator with an object in the environment of the robot manipulator occurs, the robot manipulator is decelerated from its current velocity in a short time. The robot manipulator experiences a certain (negative) acceleration in the process. The time in which the robot manipulator is decelerated—that is, the acceleration which acts on the robot manipulator—depends, in particular, on the velocity prevailing immediately before the collision, and also, in particular, on the stiffness of the entire structure of the robot manipulator, in particular, on the material on the component that collides directly with the object, as well as a stiffness of the object itself. It is intuitively clear that, in the event of a collision with a concrete wall, the robot manipulator experiences a significantly higher acceleration in the collision than in a collision with soft wood or plastic.

The stiffness of the object in the environment of the robot manipulator indicates, in particular, a resistance to deformation of the object, this resistance being composed on the one hand of material constants of the material from which the object is made, and also of a shape of the object. For example, a metallic spiral spring usually consists of a material with a high modulus of elasticity and high tensile strength, but can be deformed with relatively little force in the direction of the axis of the spiral spring due to the corresponding shape.

The stiffness of the object in the environment of the robot manipulator is preferably known through prior knowledge. The detection of an actual stiffness and/or an actual mass of the object in the environment of the robot manipulator by prior knowledge takes place, in particular, via an input by a user. Since this is not always possible, in particular, due to operational uncertainties and in a variable environment of the robot manipulator, the environment of the robot is alternatively preferably detected with sensors, in particular, cameras. From this detection, the given object is identified, in particular, by assigning the detected object in the environment of the robot manipulator to one of a plurality of saved objects. If there is no information about the stiffness of the object from the above options, the stiffness of the object is preferably assumed to be infinite, which advantageously assumes a conservative estimate as the extreme value, such that a safe velocity is always found for the robot manipulator, regardless of the actual stiffness of the object in the environment of the robot manipulator. Infinitely high stiffness means that the object does not show any flexibility in the event of a collision, and the collision is therefore cushioned exclusively by the elasticity in the robot manipulator. An infinitely high mass means that instead of considering two masses in elastic or plastic collision, according to which both masses have a velocity after the collision, the second of the masses, namely the object, has no velocity, both after the collision and before the collision.

The data records in the database are preferably determined experimentally. Alternatively, the permissible velocity is preferably determined theoretically for the database. For this purpose, a top maximum permissible torque $\tau_{max}$ which is allowed to act on a gearing of a joint is initially determined. Position sensors in all joints of the robot manipulator allow a complete determination of the position of the robot manipulator, since all joint angles are known. This in turn allows the derivation of a Jacobi matrix that is valid for this pose of the robot manipulator and is well known in robotics J. Using the Jacobi matrix, the predetermined maximum permissible torque for the gearing of the joint can be converted into an external force $F_{max}$, such that the pseudoinverse of the transpose of J, referred to as $(J_T)^{\#}$, is applicable:

$$F_{max} = (J^T)^{\#} \tau_{max}$$

The application of the law of conservation of energy, to equate the kinetic energy involving the velocity v and mass m of the robot manipulator at the point in time immediately before the collision with the collision energy absorbed by the robot manipulator and by the object itself over a path s with the given stiffness k is expressed as:

$$E = \tfrac{1}{2} \cdot m \cdot v_{max}^2 = F_{max} \cdot s, k = F_{max}/s$$

And thus:

$$F_{max} = v_{max} \cdot \sqrt{k/2 \cdot m}$$

As such, a force at a certain surface point is determined by the maximum permissible prespecified torque on the gearing of the joint of the robot manipulator, and this force also determines a maximum permissible normal velocity as a function of the mass and the stiffness of the robot manipulator and the object.

It is an advantageous effect of the invention that the robot manipulator is actuated with only such a velocity at each of the surface points, such that an unexpected collision with an object in the environment of the robot manipulator does not result in damage to the robot manipulator. The damage to the robot manipulator in this case relates, in particular, to a deformation of one of the links of the robot manipulator, as well as an overloading of the gearing which is arranged on a joint connecting two links of the robot manipulator, which when overloaded causes a shaft-hub connection to slip, or even causes a first gear to skip over a second gear. By advantageously considering the normal velocity, i.e., the velocity component of the overall velocity vector of each of the surface points which is perpendicular to the surface at each of the surface points, a more precise result for damage prediction is advantageously achieved. This is because experience has shown that tangential forces only exert a minor influence on each surface point and do not contribute substantially to damage.

According to an advantageous embodiment, each data record also indicates a safe normal velocity of each given surface point for each of a plurality of possible poses and mass distributions of the robot manipulator, and the method further includes:

detecting a current or future pose and an actual mass distribution of the robot manipulator and assigning the current or future pose and the actual mass distribution of the robot manipulator to a safe normal velocity of a given data record for each of the surface points.

According to a further advantageous embodiment, each of the data records also indicates a safe normal velocity of each of the surface points for each of a plurality of possible stiffnesses and/or moments of inertia of the given component on which the given surface point is arranged, and the method further includes:

detecting an actual stiffness and/or an actual moment of inertia of the given component; and assigning the actual stiffness and/or the actual moment of inertia of each of the components to a safe normal velocity of the given data record for each of the surface points.

The moment of inertia of the given component indicates, in particular, its geometrically determined resistance to deformation. This embodiment advantageously takes into account more details of the robot manipulator, in order to specify even more precisely a safe normal velocity that is as high as possible.

According to a further advantageous embodiment, each data record also indicates a safe normal velocity of each of the surface points for each of a plurality of possible relationships between the surface shape of the surface of the given component on which the given surface point is arranged and a geometric shape of the object, and the method further includes:

detecting the actual relationship between the surface shape of the surface of the given component on which the given surface point is arranged and a geometric shape of the object; and assigning the detected actual relationship to a safe normal velocity of a given data record for each of the surface points.

The relationship between these geometric shapes is a determining factor for impact force on the robot manipulator in the event of a collision with the object. Compared to a crash between a convex shape and a concave shape, if the stiffnesses are the same, a crash between two convex shapes will result in a different impact force. By taking these relationships into account, the impact force in the event of a collision can advantageously be estimated more precisely, which leads to a better specification of a safe normal velocity.

According to a further advantageous embodiment, the surface shape of the surface of the given component and the geometric shape of the object are each specified in one of the following categories:

convexly curved surface with radius of curvature r;
  concavely curved surface with radius of curvature r;
  wedge-shaped surface; and
  acuteness of the surface.

According to a further advantageous embodiment, the stiffness of the component on which the given surface point is arranged, and the stiffness at each of the locations of the surface points of the robot manipulator, each include at least one of the following elements:

modulus of elasticity;
  degree of hardness;
  yield stress;
  plastic or elastic behavior and
  ductility.

While the degree of hardness indicates a measure of the resistance to penetration of a body, the modulus of elasticity indicates a resistance, in particular, when the material is subjected to tensile force. The yield stress refers, in particular, to the stress up to which a material does not show any permanent plastic deformation under uniaxial and tensile stress without torsion. The ductility of the material indicates, in particular, how far the material deforms plastically before failure occurs in the material. This variable is advantageously also taken into account in order to take into account damage to the given component itself, in particular, near the surface.

According to a further advantageous embodiment, each safe normal velocity specified in the database is assigned to a first degree of damage to a given component on which the given surface point is arranged, and/or to a second degree of damage to at least one joint of the robot manipulator. This embodiment advantageously takes into account both possible damage to the given component, in particular, to a link of the robot manipulator, and possible damage to a given joint of the robot manipulator. In particular, taking possible damage to a given joint into account is advantageous because the drives are typically arranged in the joints of a robot manipulator, and the drives are typically connected to a gearing. Such a gearing is one of the most frequent causes of damage to the robot manipulator in the event of a collision described above.

According to a further advantageous embodiment, the second degree of damage to the at least one joint includes a load on a gearing, wherein the gearing is connected to a motor in the given joint and is used to move two robot links connected by the joint about the joint.

According to a further advantageous embodiment, the load on the gearing includes a first characteristic value and/or a second characteristic value, or a sum of the first characteristic value and the second characteristic value, the first characteristic value being a momentum on the gearing in the event of a collision of the robot links with the object, which is a function of the current velocity of the robot links and is caused by the inertia of the robot links, and the second characteristic value being an angular momentum due to the rotation of an electric motor at the given joint in which the gearing is arranged, which is transmitted to the gearing during the collision. In this embodiment, two load mechanisms that are detrimental to the gearing are advantageously taken into account. On the one hand, this generally creates a loading moment, especially when the end effector or another link of the robot manipulator collides with the object at a moment when the robot manipulator itself and therefore also the masses distributed over the robot manipulator still have a certain momentum, and are inclined to continue moving due to their inertia—and this further movement is stopped by the collision with the object. On the other hand, every drive of the robot manipulator between two moving links of the robot manipulator will generally have an angular momentum, for example, the angular momentum of the motor of an electric motor, which is transmitted directly to the gearing by the sudden stop in the event of a collision with the object. The angular momentum of the motor can therefore overlap with the moment described above produced by the inertia of the robot manipulator, and can thus lead to an overload torque on the gearing. In this embodiment, therefore, only one of the two types of damage, and/or the sum of the two types of damage, are advantageously taken into account in order to advantageously prevent overloading of the gearing.

Another aspect of the invention relates to a robot manipulator having a control unit, the control unit being designed to:

provide a database, the database having a data record for each of a plurality of selected surface points on the robot manipulator, wherein each data record specifies a safe normal velocity of each of the surface points for each of a plurality of possible stiffnesses and/or masses of an object in the environment of the robot manipulator, wherein the normal velocity is the component of the velocity vector of each of the surface points which is perpendicular to the surface at each of the surface points;

detect an actual stiffness and/or an actual mass of the object in the environment of the robot manipulator by prior knowledge or by sensor detection, or assuming infinity;

assign the detected actual stiffness and/or the actual mass to a safe normal velocity of a given data record for each of the surface points; and specify a velocity for each of the surface points on a current or planned path of the robot manipulator in such a manner that the normal velocity occurring at each surface point is less than or equal to the assigned safe normal velocity.

Advantages and preferred developments of the proposed robot manipulator can be derived from an analogous and corresponding transfer of the statements made above in connection with the proposed method.

Further advantages, features and details can be derived from the following description, in which—with reference to the drawings, if necessary—at least one embodiment is described in detail. Identical, similar, and/or functionally identical parts are denoted with the same reference signs.

The illustrations in the figures are schematic and not to scale.

DETAILED DESCRIPTION

Figure 1:
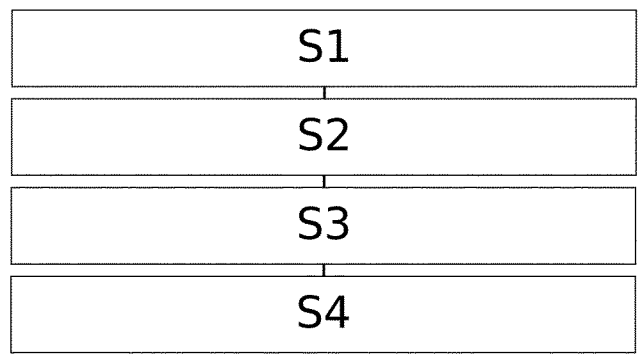
FIG. 1 is a method for specifying a safe velocity of a robot manipulator, according to an embodiment of the invention.

FIG. 1 shows a method for specifying a safe velocity of a robot manipulator 1, the method including:

providing S1 a database, wherein the database has a data record for each of a plurality of selected surface points 5 on the robot manipulator 1, wherein each data record indicates a safe normal velocity of each of the surface points 5 for each of a plurality of possible stiffnesses and/or masses of an object 3 in the environment of the robot manipulator 1, and for each of a plurality of possible poses and mass distributions of the robot manipulator 1, wherein the normal velocity in each case is the component of the velocity vector of each of the surface points 5 which is perpendicular to the surface of each of the surface points 5, and is assigned to a first degree of damage to a given component on which the given surface point 5 is arranged, and is assigned to a second degree of damage to at least one joint of the robot manipulator 1, wherein the second degree of damage to the at least one joint includes a load on a gearing, wherein the gearing is connected to a motor at the given joint and is used to move two robot links connected by the given joint about the given joint, wherein the load on the gearing is a sum of a first characteristic value and a second characteristic value. The first characteristic value is a momentum on the gearing that is dependent on the current velocity of the robot links, and is caused by the inertia of the robot links when the robot links collide with the object 3, and the second characteristic value is an angular momentum due to the rotation of an electric motor at the given joint in which the given gearing is arranged, which is transmitted to the gearing during the collision. The following steps are also carried out:

detecting S2 an actual stiffness and/or an actual mass of the object 3 in the environment of the robot manipulator 1 through prior knowledge or through sensory sensing, or assuming infinity, and of a current or future pose and an actual mass distribution of the robot manipulator 1;

assigning S3 the detected actual stiffness and/or the actual mass, and the current or future pose, and the actual mass distribution of the robot manipulator 1, to a safe normal velocity of the given data record for each of the surface points 5; and specifying S4 a velocity for each of the surface points 5 on a current or planned path of the robot manipulator 1, such that the normal velocity occurring at each of the surface points is less than or equal to the assigned safe normal velocity.

Figure 2:
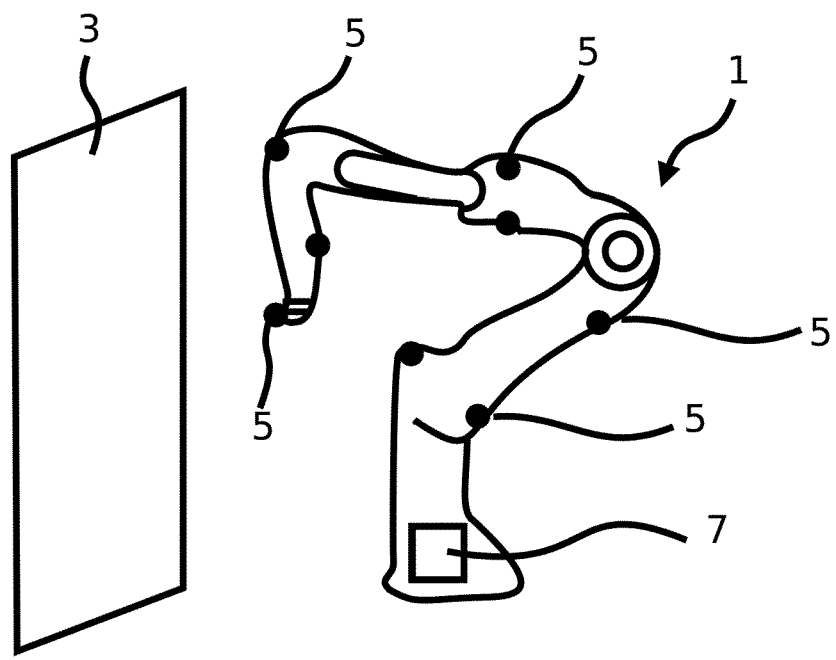
FIG. 2 is a robot manipulator having a control unit to carry out the method according to FIG. 1.

FIG. 2 shows a robot manipulator 1 having a control unit 7, the control unit 7 being designed to:

provide a database, wherein the database has a data record for each of a plurality of selected surface points 5 on the robot manipulator 1, wherein each data record indicates a safe normal velocity of each of the surface points 5 for each of a plurality of possible stiffnesses and/or masses of an object 3 in the environment of the robot manipulator 1, wherein the normal velocity is the component of the velocity vector of each of the surface points 5 which is perpendicular to the surface of each of the surface points 5;

detect an actual stiffness and/or an actual mass of the object 3 in the environment of the robot manipulator 1 by prior knowledge or by sensor detection, or assuming infinity;

assign the detected actual stiffness and/or the actual mass to a safe normal velocity of the given data record for each of the surface points 5; and specify a velocity for each of the surface points 5 on a current or planned path of the robot manipulator 1 in such a way that the normal velocity occurring at each of the surface points is less than or equal to the assigned safe normal velocity.

Even though the invention has been illustrated and explained in greater detail via preferred embodiments, the invention is not limited by the disclosed examples, and other variations can be derived therefrom by a person skilled in the art without departing from the scope of protection of the invention. It is therefore clear that there is a plurality of possible variations. It is also clear that embodiments mentioned by way of example actually only constitute examples that are not to be interpreted in any way as a limitation of the scope of protection, of the potential applications, or of the configuration of the invention. Instead, the preceding description and the description of the figures enable a person skilled in the art to specifically implement the example embodiments, wherein a person skilled in the art, having knowledge of the disclosed inventive concept, is able to make numerous modifications, for example, with respect to the function or the arrangement of individual elements mentioned in an embodiment, without departing from the scope of protection, which is defined by the claims and their legal equivalents, such as a further explanation in the description.

LIST OF REFERENCE NUMERALS

1 Robot manipulator
3 Object
5 Surface points
7 Control unit
S1 Providing
S2 Detecting
S3 Assigning
S4 Specifying

The invention claimed is:

1. A method for specifying a safe velocity of a robot manipulator, the method comprising:

providing a database, wherein the database has a data record for each of a plurality of selected surface points on the robot manipulator, wherein each data record indicates, for each of a plurality of possible stiffnesses and/or masses of an object in the environment of the robot manipulator, a safe normal velocity of each of the surface points, wherein the normal velocity is the component of the velocity vector of each of the surface points which is perpendicular to the local surface of the robot manipulator at each of the surface points;

detecting an actual stiffness and/or an actual mass of the object in the environment of the robot manipulator by prior knowledge or by sensor detection, or assuming infinity;

assigning the detected actual stiffness and/or the actual mass to a safe normal velocity of the given data record for each of the surface points; and specifying a velocity for each of the surface points on a current or planned path of the robot manipulator, such that the normal velocity occurring at each of the surface points is less than or equal to the assigned safe normal velocity.

2. The method according to claim 1, wherein each data record also indicates, for each of a plurality of possible poses and mass distributions of the robot manipulator, a safe normal velocity of each of the surface points, the method further comprising:

detecting a current or future pose and an actual mass distribution of the robot manipulator; and assigning the current or future pose and the actual mass distribution of the robot manipulator to a safe normal velocity of a given data record for each of the surface points.

3. The method according to claim 1, wherein each data record also indicates, for each of a plurality of possible stiffnesses and/or moments of inertia of each structural element on which the given surface point is arranged, a safe normal velocity of each of the surface points, the method further comprising:

detecting an actual stiffness and/or an actual moment of inertia of the given component; and assigning the actual stiffness and/or the actual moment of inertia of each of the components to a safe normal velocity of the given data record for each of the surface points.

4. The method according to claim 1, wherein each data record also indicates, for each of a plurality of possible relationships between the surface shape of the surface of the given component on which the given surface point is arranged and a geometric shape of the object, a safe normal velocity of each of the surface points, the method further comprising:

detecting the actual relationship between the surface shape of the surface of the given component on which the given surface point is arranged and a geometric shape of the object; and assigning the detected actual relationship to a safe normal velocity of a given data record for each of the surface points.

5. The method according to claim 4, wherein the surface shape of the surface of the given component and the geometric shape of the object are each indicated in one of the following categories:

convexly curved surface with radius of curvature r;
concavely curved surface with radius of curvature r;
wedge-shaped surface; and
acuteness of the surface.

6. The method according to claim 3, wherein the stiffness of the component on which the given surface point is arranged and the stiffness at each of the locations of the surface points of the robot manipulator each comprise at least one of the following elements:

modulus of elasticity;
degree of hardness;
yield stress;
plastic or elastic behavior; and
ductility.

7. The method according to claim 1, wherein each safe normal velocity specified in the database is assigned to a first degree of damage to a given component on which the given surface point is arranged, and/or to a second degree of damage to at least one joint of the robot manipulator.

8. The method according to claim 7, wherein the second degree of damage to the at least one joint comprises a load on a gearing, the gearing being connected to a motor in the given joint and serving to move two robot links connected by the joint about the joint.

9. The method according to claim 8, wherein the load on the gearing comprises a first characteristic value and/or a second characteristic value, or a sum of the first characteristic value and the second characteristic value, wherein the first characteristic value is a momentum on the gearing that is dependent on the current velocity of the robot links, and is caused by the inertia of the robot links when the robot links collide with the object; and the second characteristic value is an angular momentum due to the rotation of an electric motor at the given joint in which the given gearing is arranged, which is transmitted to the gearing during the collision.

10. A robot manipulator, having a control unit, wherein the control unit is configured to:

provide a database, wherein the database has a data record for each of a plurality of selected surface points on the robot manipulator, wherein each data record indicates, for each of a plurality of possible stiffnesses and/or masses of an object in the environment of the robot manipulator, a safe normal velocity of each of the surface points, wherein the normal velocity is the component of the velocity vector of each of the surface points which is perpendicular to the local surface of the robot manipulator at each of the surface points;

detect an actual stiffness and/or an actual mass of the object in the environment of the robot manipulator by prior knowledge or by sensor detection, or assuming infinity;

assign the detected actual stiffness and/or the actual mass to a safe normal velocity of the given data record for each of the surface points; and specify a velocity for each of the surface points on a current or planned path of the robot manipulator in such a way that the normal velocity occurring at each of the surface points is less than or equal to the assigned safe normal velocity.

11. The robot manipulator according to claim 10, wherein each data record also indicates, for each of a plurality of possible poses and mass distributions of the robot manipulator, a safe normal velocity of each of the surface points, the control unit further configured to:

detect a current or future pose and an actual mass distribution of the robot manipulator; and assign the current or future pose and the actual mass distribution of the robot manipulator to a safe normal velocity of a given data record for each of the surface points.

12. The robot manipulator according to claim 10, wherein each data record also indicates, for each of a plurality of possible stiffnesses and/or moments of inertia of each structural element on which the given surface point is arranged, a safe normal velocity of each of the surface points, the control unit further configured to:
- detect an actual stiffness and/or an actual moment of inertia of the given component; and
- assign the actual stiffness and/or the actual moment of inertia of each of the components to a safe normal velocity of the given data record for each of the surface points.

13. The robot manipulator according to claim 10, wherein each data record also indicates, for each of a plurality of possible relationships between the surface shape of the surface of the given component on which the given surface point is arranged and a geometric shape of the object, a safe normal velocity of each of the surface points, the control unit further configured to:
- detect the actual relationship between the surface shape of the surface of the given component on which the given surface point is arranged and a geometric shape of the object; and
- assign the detected actual relationship to a safe normal velocity of a given data record for each of the surface points.

14. The robot manipulator according to claim 13, wherein the surface shape of the surface of the given component and the geometric shape of the object are each indicated in one of the following categories:
- convexly curved surface with radius of curvature r;
- concavely curved surface with radius of curvature r;
- wedge-shaped surface; and
- acuteness of the surface.

15. The robot manipulator according to claim 12, wherein the stiffness of the component on which the given surface point is arranged and the stiffness at each of the locations of the surface points of the robot manipulator each comprise at least one of the following elements:
- modulus of elasticity;
- degree of hardness;
- yield stress;
- plastic or elastic behavior; and
- ductility.

16. The robot manipulator according to claim 10, wherein each safe normal velocity specified in the database is assigned to a first degree of damage to a given component on which the given surface point is arranged, and/or to a second degree of damage to at least one joint of the robot manipulator.

17. The robot manipulator according to claim 16, wherein the second degree of damage to the at least one joint comprises a load on a gearing, the gearing being connected to a motor in the given joint and serving to move two robot links connected by the joint about the joint.

18. The robot manipulator according to claim 17, wherein the load on the gearing comprises a first characteristic value and/or a second characteristic value, or a sum of the first characteristic value and the second characteristic value, wherein
- the first characteristic value is a momentum on the gearing that is dependent on the current velocity of the robot links, and is caused by the inertia of the robot links when the robot links collide with the object; and
- the second characteristic value is an angular momentum due to the rotation of an electric motor at the given joint in which the given gearing is arranged, which is transmitted to the gearing during the collision.

* * * * *